United States Patent [19]
Jackson

[11] Patent Number: 6,137,818
[45] Date of Patent: Oct. 24, 2000

[54] EXCITATION OF GAS SLAB LASERS

[75] Inventor: Paul E. Jackson, Sturbridge, Mass.

[73] Assignee: Excitation LLC, Springfield, Mass.

[21] Appl. No.: 09/148,714

[22] Filed: Sep. 4, 1998

[51] Int. Cl.[7] ................................................. H01S 3/097
[52] U.S. Cl. ................................ 372/81; 372/82; 372/87
[58] Field of Search ................................. 372/81, 82, 87

[56] References Cited

U.S. PATENT DOCUMENTS

| | | | |
|---|---|---|---|
| 4,352,188 | 9/1982 | Griffith | 372/82 |
| 4,363,126 | 12/1982 | Chenausky et al. | 372/82 |
| 4,375,690 | 3/1983 | Tabata et al. | 372/82 |
| 4,443,877 | 4/1984 | Chenausky et al. | 372/38 |
| 4,618,961 | 10/1986 | Sutter, Jr. | 372/87 |
| 4,633,478 | 12/1986 | Robusto | 372/83 |
| 5,008,894 | 4/1991 | Laakmann | 372/38 |
| 5,065,405 | 11/1991 | Laakmann et al. | 372/92 |
| 5,236,039 | 8/1993 | Edelstein et al. | 166/248 |

FOREIGN PATENT DOCUMENTS

| | | | |
|---|---|---|---|
| 0 034 124 | 8/1981 | European Pat. Off. | H01S 3/097 |
| 183087 | 11/1982 | Japan | H01S 3/097 |
| 60-147186 | 3/1985 | Japan | H01S 3/097 |
| 5-299741 | 4/1992 | Japan . | |
| 299741 | 11/1993 | Japan | H01S 3/097 |

OTHER PUBLICATIONS

D.R. Hall and H.J. Baker, "Slab Waveguide Carbon Dioxide Laser", Japan Society of Laser Technology, vol. 20(4), pp. 31–52, Oct. 1995.

Yuri P. Raizer et al., "Self–excited tube generators", in "Radio–Frequency Capacitative Discharges", CRC Press, Boca Raton, ISBN 0–8493–8644–6, sect. 4.7.1, pp. 215–221, 1995.

*Primary Examiner*—Frank G. Font
*Assistant Examiner*—Armando Rodriguez
*Attorney, Agent, or Firm*—McCormick, Paulding & Huber LLP

[57] ABSTRACT

An RF-excited discharge laser includes a pair of electrodes and an RF power source, both electrodes being ungrounded, the power source being adapted to apply an RF voltage to both electrodes, the respective voltages applied to each plate being out of phase. A balanced discharge is thereby established in which the inter-electrode voltage is unchanged whilst the potential difference between each electrode and the surrounding grounded surfaces is halved. Thus, the trade off between discharge power and discharge escape likelihood is overcome. The voltages applied to the electrodes are preferably 180 degrees out of phase, or nearly so. One way of delivering the RF energy to the electrodes is to provide a power splitter to divide the output of the RF supply into two outputs, one of which is delivered to one electrode and the other of which is delivered to the other electrode in substantial anti-phase. This anti-phase delivery can be achieved by, for example, employing coaxial cable with an additional half-wavelength. An alternative manner of delivering the voltages to both electrodes is to supply the RF energy directly to a single electrode, and connect the other electrode to a quarter wavelength transmission path. A suitable transmission path is an end-grounded RF transmission line, such as a coaxial cable, preferably connected via a suitable matching network.

7 Claims, 2 Drawing Sheets

EXCITATION OF GAS SLAB LASERS

FIELD OF THE INVENTION

The present invention relates to the excitation of gas slab lasers.

SUMMARY OF BACKGROUND ART

FIG. 1 illustrates schematically a capacitively coupled radio-frequency (RF) gas laser discharge. There is a significant electrical structure in the transverse (inter-electrode) direction, which is discussed in detail by D. R. Hall and H. J. Baker, "Slab Waveguide Carbon Dioxide Lasers", Japan Society of Laser Technology, 20(4), p31–52, October 1995 and Y. P. Raizer et al, "Radio-Frequency Capacitive Discharges", CRC Press, Fl, 1995, both of which are herein incorporated by reference.

In gas slab lasers, a high concentration exists of positively charged ions close to each electrode 2, 4. These are referred to as the ion-sheath regions 6, 8, and have a considerable influence on the discharge characteristics. Between these two sheaths is the plasma region 9, where the bulk of the laser excitation occurs. It has been known for many years that an alpha-type discharge characterized by a stable and positive impedance can provide efficient excitation of the upper laser levels in a gas discharge laser. The role of the sheath regions is believed to be critical in providing an effective stabilizing ballast for the plasma region. If for some reason conditions evolve where the sheath region is eroded in some way, then the stability of the alpha-type discharge is threatened and transition may occur to a gamma-type form of RF discharge. In extreme cases, and particularly with the application of high power RF, the onset of the gamma-type discharge can precede the collapse of the entire discharge to an arc. This usually results in catastrophic laser failure.

An important feature in the design of gas slab lasers is the formation of a rectangular discharge gain medium which is extremely uniform in lateral and longitudinal direction. The sheath voltage can be very large (e.g. 50–150 $V_{rms}$), with a correspondingly low plasma reduced electric field. This field can be as low as approximately 0.4 $V_{rms}$/cm. The discharge impedance can be very low, typically a few ohms. The high electric field in the ion sheath gives rise to energetic electrons (50–150 eV), which penetrate into the plasma region and generate an electron temperature suitable for the formation and population of the upper laser levels.

The ion sheath properties can enhance laser performance at lower RF frequencies such as 10–150 MHz. However, the freedom to select lower frequencies is typically limited by the need to ensure that the discharge is confined to the space between the electrodes over the full range of RF input powers, without escaping over longer paths to the surrounding grounded surfaces. This is easily achieved at frequencies above 150 MHz, but at lower frequencies this becomes progressively more difficult. These frequencies tend to be the optimum frequencies for maximum laser power extraction, however.

It is known to provide inductors between the electrodes at intervals along their length to alter the characteristic impedance of the RF stripline formed by the electrodes. The inductor values can be chosen to minimize the longitudinal voltage variations and hence non-uniformities in the discharge that arise from the RF standing waves.

FIG. 2 shows a typical circuit for an RF-excited gas discharge. Examples can be seen in Griffith (U.S. Pat. No. 4,352,188) and Chenausky (U.S. Pat. No. 4,363,126 and U.S. Pat. No. 4,443,877), each of which is herein incorporated by reference. An RF power source 10 is fed to the discharge electrodes 12 via a coaxial cable 14, an impedance matching network 16, and an RF vacuum feed-through connector 18 to the center of the electrodes 12.

SUMMARY OF THE INVENTION

The present invention therefore provides an RF-excited discharge laser comprising a pair of electrodes and an RF power source, both electrodes being ungrounded, the power source being adapted to apply an RF voltage to both electrodes, the respective voltages applied to each plate being out of phase.

The potential difference between the RF electrode of Griffith and Chenausky and the surrounding grounded surfaces is of course halved when the RF voltage applied to the electrode concerned is halved. This lowering of the potential difference will reduce the risk of escape of the discharge. However, in known discharge arrangements, lowering the input voltage will weaken the discharge and reduce laser power.

According to the present invention, a balanced discharge is established in which the inter-electrode voltage can remain unchanged whilst the potential difference between each electrode and the surrounding grounded surfaces is nevertheless halved. Thus, the trade off between discharge power and discharge escape likelihood is overcome. This means that for identical discharge energy, the frequency can be reduced towards the optimum frequency without increasing the risk of escape.

Preferably, the voltages applied to the electrodes are 180 degrees out of phase, or nearly so.

One way of delivering the RF energy to the electrodes is to provide a power splitter to divide the output of the RF supply into two outputs, one of which is delivered to one electrode and the other of which is delivered to the other electrode in substantial anti-phase. This anti-phase delivery can be achieved by, for example, employing coaxial cable with an additional half-wavelength.

An alternative manner of delivering the voltages to both electrodes is to supply the RF energy directly to a single electrode, and couple RF energy to the other electrode capacitively across the gap between the electrodes. The other electrode is then terminated with a circuit that presents an open impedance to the electrode, such as shorted quarter wavelength stub or open half wave stub, such that anti-phase RF voltages are applied to the electrodes. Many such circuits are known in the art, and, accordingly one of ordinary skill in the art, apprised of the disclosure herein, can readily envision many equivalents to the shorted quarter wave stub and the open half-wave stub. See for example, the classic text *Foundations For Microwave Engineering*, by R. E. Collin, McGraw-Hill Book Company, 1966 or *Microwave Engineering*, by David Pozar, Addison Wesley, 1990, both of which are herein incorporated by reference.

DETAILED DESCRIPTION OF PREFERRED EMBODIMENTS

Figure 3:
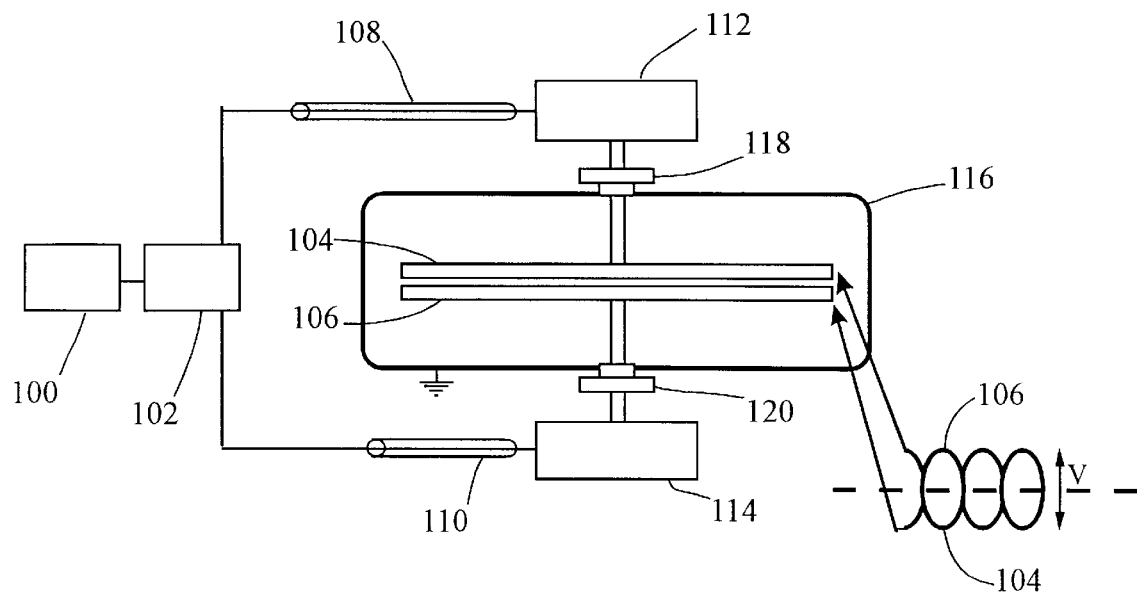
FIG. 3 schematically illustrates a first embodiment of the present invention.

FIG. 3 shows a first embodiment of the present invention. An RF supply 10 delivers RF power to a power splitter 102, which then delivers power to the electrodes 104, 106 respectively via RF transmission lines, such as the coaxial cables 108, 110 and matching networks 112, 114. RF power is transmitted through the vacuum envelope 116 via RF feed-throughs 118, 120 which then deliver the RF power direct to the electrodes 104, 106. It should be noted that the coaxial cable 108 delivering the RF power to electrode 104 is longer than coaxial cable 110 delivering power to electrode 106. The difference in length corresponds to an odd integer number of half wavelengths of the RF frequency selected. Thus, the RF voltages are applied to the electrodes 104, 106 in anti-phase.

FIG. 3 also shows the voltage wave form applied to the two electrodes, and it can be seen the effective voltage V between the two electrodes varies sinusoidally. This can be compared to the corresponding wave form shown in FIG. 2, where one electrode is grounded. The potential difference between the electrodes also varies sinusoidally, and achieves the same peak inter-electrode voltage. However, the peak electrode voltage relative to ground is twice that in FIG. 2 as in FIG. 3. Thus, the likelihood of discharge from the electrode to the vacuum envelope is significantly higher in the known arrangement of FIG. 2 than in the arrangement of FIG. 3.

Figure 1:
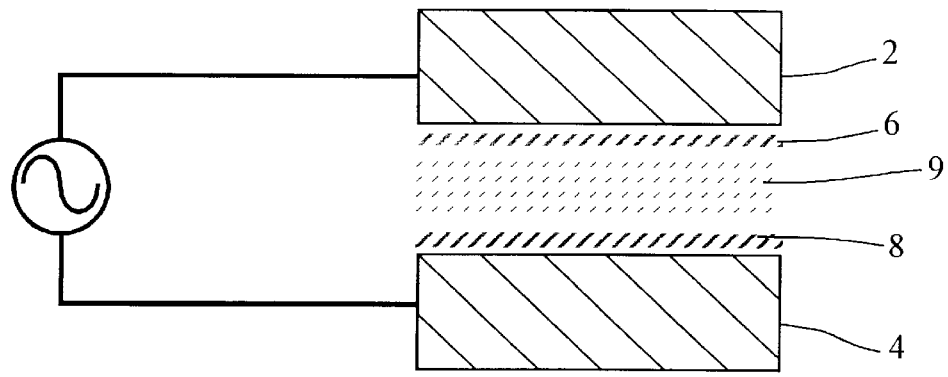
FIG. 1 schematically illustrates the electrical structure of an RF discharge.
Figure 2:
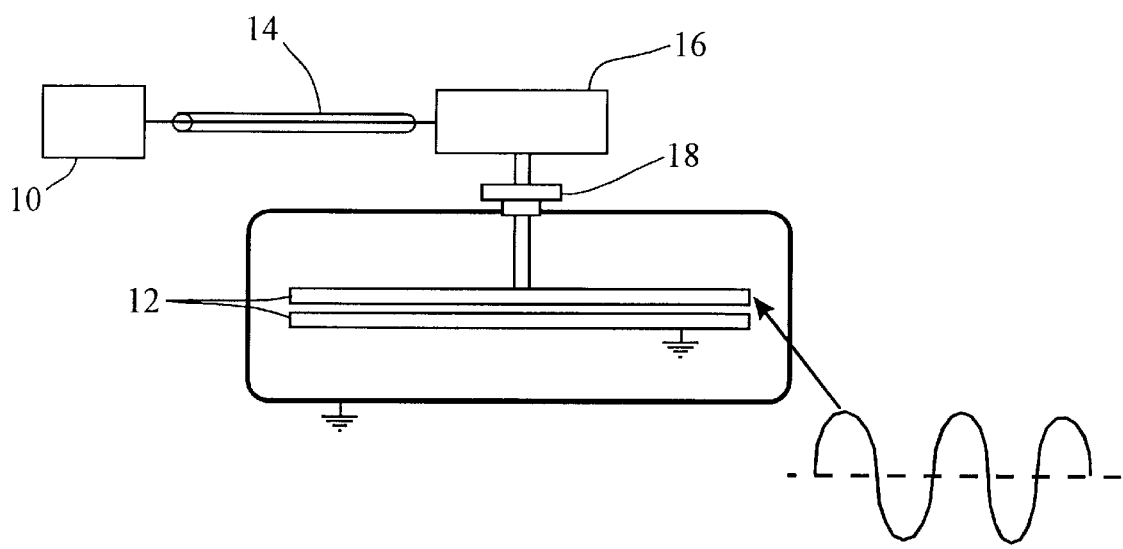
FIG. 2 schematically illustrates a known RF discharge arrangement.

It can also be seen from FIG. 3 that the RF power delivered to each electrode is half that of the RF power delivered to the one electrode in FIG. 2. Thus, the power ratings of the two RF feed-through connectors can be half that of FIG. 2.

Figure 4:
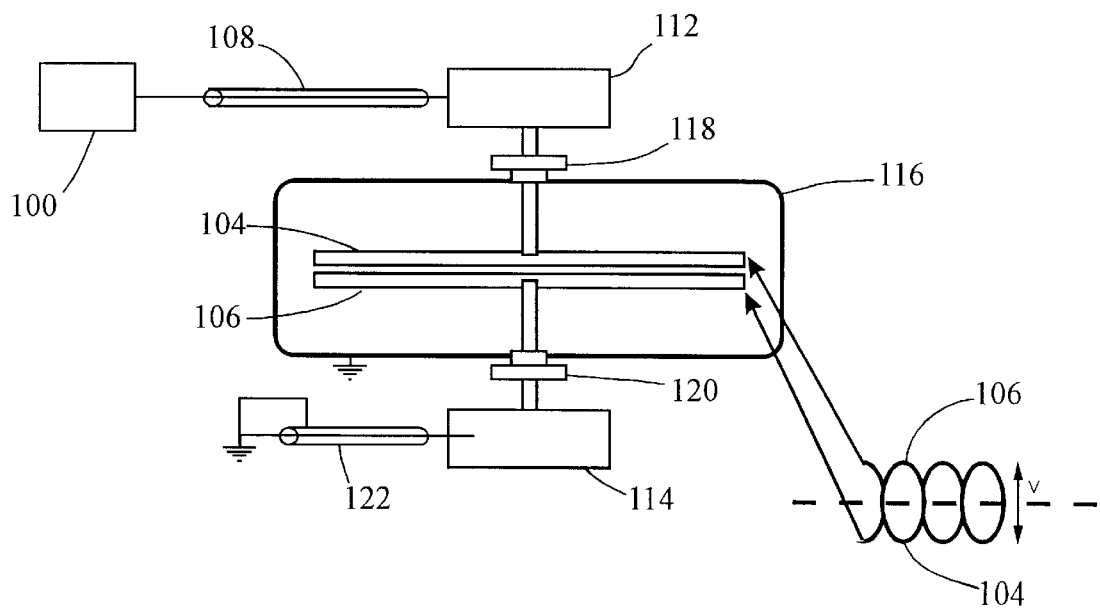
FIG. 4 schematically illustrates a second embodiment of the present invention.

If the power rating of the feed-through connector is not a limitation then the second embodiment illustrated in FIG. 4 may be advantageous. A single coaxial cable 108 delivers power from an unsplit RF supply 100 to the electrode 104 via a matching network 112 and an RF feed-through 118. The other electrode 106 is connected via an RF feed-through and a matching network 114 to stub coaxial cable 122 corresponding to an odd integer number of quarter wavelengths. RF power will thus be capacitively coupled to the electrode 106 from the electrode 104, reflected at the far end of the coaxial cable 122, and returned to the electrode 106. The arriving RF energy will then be in anti-phase with the voltage of the electrode 104. RF network analysis shows that such a single feed with stub method closely emulates a twin-feed balanced method of excitation.

The present embodiments can be applied to multi-kilowatt $CO_2$ gas discharge lasers. Suitable slab electrode dimensions are approximately 120 mm by 1200 mm, with a spacing of approximately 2 mm. A stable and full discharge requires approximately 10 W average RF power per sq. cm of discharge area. This is derived with up to 20 kW of RF power at 100 MHz from an RF power oscillator which splits the RF power equally through two equal length 50-ohm coaxial cables, yet provides a 180 degree phase difference between the RF voltage at the cable terminations into identical loads. The cables are identically terminated at the input to two impedance matching pi-networks, with each of their outputs connected to RF vacuum feed-through ports to the opposing electrodes. If the shared discharge impedance split is assumed to be a simple quadratic, then each pi-network performs a 50-to-1.0 ohm impedance transformation for a 4-ohm discharge excitation.

What is claimed is:

1. An RF excited discharge laser comprising:

first and second electrodes, both being ungrounded;

an RF power source; and a power splitter;

wherein said power source provides an RF voltage to said power splitter, and wherein said power splitter divides said RF voltage into first and second voltage outputs to be delivered to said first and second electrodes, respectively.

2. A laser according to claim 1 wherein the voltage outputs are applied to the electrodes about 180 degrees out of phase.

3. A laser according to claim 1 wherein one of the voltage outputs is delivered to one electrode and the other of which is delivered to the other electrode in substantial anti-phase.

4. A laser according to claim 3 wherein said substantial anti-phase delivery is achieved by including an RF transmission line with an additional odd integer number of half-wavelengths in the transmission path to one electrode.

5. An RF-excited discharge laser comprising, first and second electrodes, both being ungrounded; and an RF power source;

wherein said power source applies an RF voltage directly to one electrode, and the other electrode is connected to a transmission line including an odd integer number of quarter wavelengths.

6. A laser according to claim 5 wherein the quarter wavelength transmission line is an end grounded coaxial cable.

7. A laser according to claim 6 wherein the end-grounded coaxial cable is connected via a suitable matching network.

* * * * *